United States Patent
Heinzelmann

(10) Patent No.: US 8,438,906 B2
(45) Date of Patent: May 14, 2013

(54) APPARATUS AND METHOD FOR THE DETECTION OF KNOCKING COMBUSTION

(75) Inventor: Stefan Heinzelmann, Talheim (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 255 days.

(21) Appl. No.: 12/920,504

(22) PCT Filed: Feb. 23, 2009

(86) PCT No.: PCT/DE2009/000240
§ 371 (c)(1),
(2), (4) Date: Oct. 7, 2010

(87) PCT Pub. No.: WO2009/109164
PCT Pub. Date: Sep. 11, 2009

(65) Prior Publication Data
US 2011/0016952 A1    Jan. 27, 2011

(30) Foreign Application Priority Data
Mar. 7, 2008    (DE) .......................... 10 2008 013 199

(51) Int. Cl.
*G01L 23/22*    (2006.01)
(52) U.S. Cl.
USPC ....................................... 73/35.08

(58) Field of Classification Search ............. 73/35.07, 73/35.08
See application file for complete search history.

(56) References Cited

U.S. PATENT DOCUMENTS

| | | | |
|---|---|---|---|
| 4,465,046 A * | 8/1984 | May | 123/406.26 |
| 4,608,855 A | 9/1986 | Blauhut | |
| 5,271,268 A | 12/1993 | Ikeuchi et al. | |
| 5,396,176 A | 3/1995 | Ishii et al. | |
| 5,801,534 A | 9/1998 | Hohner et al. | |
| 6,054,859 A * | 4/2000 | Takahashi et al. | 324/399 |
| 6,054,860 A | 4/2000 | Aoki et al. | |
| 6,155,241 A | 12/2000 | Hohner et al. | |
| 6,189,522 B1 * | 2/2001 | Moriya | 123/643 |
| 6,328,016 B1 * | 12/2001 | Takahashi et al. | 123/406.35 |
| 6,439,029 B2 | 8/2002 | Asano et al. | |
| 6,741,080 B2 * | 5/2004 | Peterson et al. | 324/399 |
| 2001/0017051 A1 | 8/2001 | Asano et al. | |
| 2003/0076022 A1 * | 4/2003 | Moriya et al. | 313/141 |

FOREIGN PATENT DOCUMENTS

| | | |
|---|---|---|
| GB | 2 404 951 A | 2/2005 |
| JP | 10-252632 A | 9/1998 |

* cited by examiner

*Primary Examiner* — Freddie Kirkland, III

(57) ABSTRACT

A device for directing combustion anomalies of an internal combustion engine, comprising at least one power supply, at least one ion current amplifier, at least one signal filter, at least one ion current signal output, at least one ignition coil actuating electronic system, at least one ignition coil, at least one ion current adapter, and at least one ion current sensor.

13 Claims, 2 Drawing Sheets

APPARATUS AND METHOD FOR THE DETECTION OF KNOCKING COMBUSTION

The invention relates to a method for the detection of knocking combustion during operation of an internal combustion engine and to an ignition system for the detection of knocking, pre-ignition and glow ignition by means of ion current in internal combustion engines.

For a long time already, attempts have been made to detect engine knocking by means of ion current measurements. To date, however, there has been no success or success to a limited degree only in detecting pre-ignition and glow ignition.

In prior systems, the frequency response which is required for the detection of engine knocking is limited too extensively through component-related parasitic inductivities and capacitors.

Due to charging times of the ignition coil or the like, the detection of pre-ignition and glow ignition has not been possible so far.

A known method is to apply an auxiliary voltage for ion current measurement via the secondary winding of the ignition coil. This is to disadvantage in that the ion current signal is attenuated via the coil and measurements are not possible while the ignition coil is charging.

Due to the finite propagation speed of combustion, the fuel-air mixture in internal combustion engines with externally supplied ignition is ignited as early as during the compression cycle before the upper dead center. Therein, the optimal ignition point is determined in relation to the rotational speed of the crankshaft. Knocking combustion is produced by ignitions that are too early wherein excessively high pressure peaks result in an increase in the temperature of the unburnt fuel-air mixture and, therefore, in local self-ignitions of the fuel-air mixture. As a rule, these excessively high pressure peaks in the combustion chambers are produced during full-load operation of the internal combustion engine.

In order to recognize knocking combustion, the pattern of the combustion chamber pressure is registered in all combustion chambers of the internal combustion engine by means of ion current measurement. For example, a method for ion current measurement is known from DE 33 27 766 A1. Therein, knocking combustion can be detected through the appearance of pressure peaks and oscillations in the pattern of the combustion chamber pressure. To achieve this, an alternating voltage is supplied to the spark plug after the fuel-air mixture has been ignited via the ignition coil, said spark plug at the same time serving as an ion current probe. This alternating voltage is modulated by ions in the burning fuel-air mixture in relation to the combustion chamber pressure. The modulated alternating voltage, i.e., the ion current raw signal, is supplied to an evaluation circuit. While the fuel-air mixture is ignited by the spark plug, the ion current measurement cannot be carried out. DE 197 20 535 A1 describes a method wherein the spark duration of the spark plug is reduced to a minimum in order to register the pattern of the combustion chamber pressure and detect potentially knocking combustion immediately thereafter.

As is disclosed in DE 197 20 532 C2, the ion current raw signal is first filtered through a bandpass filter to allow evaluation. Subsequently, the portion of the filtered signal that is not produced by knocking is suppressed through windowing. The remaining signal portions are rectified and then integrated. The resulting value of the knocking integral is proportional to the intensity of the pressure peaks in the pattern of the combustion chamber pressure.

If knocking combustion is detected in an internal combustion engine, the ignition point for the next working cycle within the compression cycle is moved towards the upper dead center. Therein, internal combustion engines unfold their maximum power if the knocking is light, whereas strong knocking gives rise to the danger that damage will gradually occur to the internal combustion engine. It is, therefore, necessary to define a threshold value for the value of the knocking integral, up to which the internal combustion engine can be operated with light knocking and starting from which the ignition point must be moved towards the upper dead center.

The problem during evaluation of an ion current signal is represented by high variations in intensity, occurring from working cycle to working cycle during the measurement of the ion current signal. As a result of such variations in intensity, ion current raw signals that are measured with low intensity and comprise strong pressure peaks and oscillations caused by knocking produce values for the knocking integral that are so low that they remain below the threshold value for the knocking integral for which reason the ignition point fails to be moved toward the upper dead center. Likewise, ion current raw signals that are measured with high intensity and comprise low pressure peaks and oscillations caused by knocking produce values for the knocking integral that are so high that they are above the threshold value for the knocking integral for which reason the ignition point is moved toward the upper dead center, with the result that the internal combustion engine does not unfold its maximum power.

In order to improve the assessment of the value of the knocking integral, DE 42 32 845 C2 proposes to determine an average value, wherein values of the knocking integral are summed up and divided by their number. This approach is to disadvantage in that, although the assessment of the values of the knocking integral is enhanced, the variations in the intensity of the ion current raw signal are still contained in the average value of the knocking integral values.

SUMMARY OF THE INVENTION

The invention aims at presenting a method for the detection of knocking combustion during operation of an internal combustion engine, which ensures a reliable assessment of the value of the knocking integral and compensates variations in the intensity of the ion current raw signal.

This problem is solved by the invention by means of the features of Claim 1.

Knocking detection in the ignition system. Advantageously, this results in saving the knocking sensors which are, otherwise, additionally required. To date, it has been possible to detect pre-ignition via knocking sensors to a limited degree only. The detection of glow ignition has not been possible so far. Data is transferred via an interface to the engine control unit.

The invention is to advantage in that the knocking sensors are not needed and that pre-ignition as well as glow ignition can be detected.

This data is provided to the engine control unit which can, then, initiate appropriate corrective measures. At present, this is not possible because glow ignition in particular cannot be detected via knocking sensors.

The existing ignition coil is, additionally, equipped with an electronic circuit which is designed to measure the ion current and filter and evaluate said ion current.

The spark plug serves as an "electrode" for the detection of the ion current in the cylinder.

Further advantageous embodiments are presented in the subordinate claims.

BRIEF DESCRIPTION OF THE DRAWINGS

Below, the structure and the function of the invention are illustrated by way of example and by means of embodiments with reference to the drawings. In the drawings.

DETAILED DESCRIPTION

Figure 1:
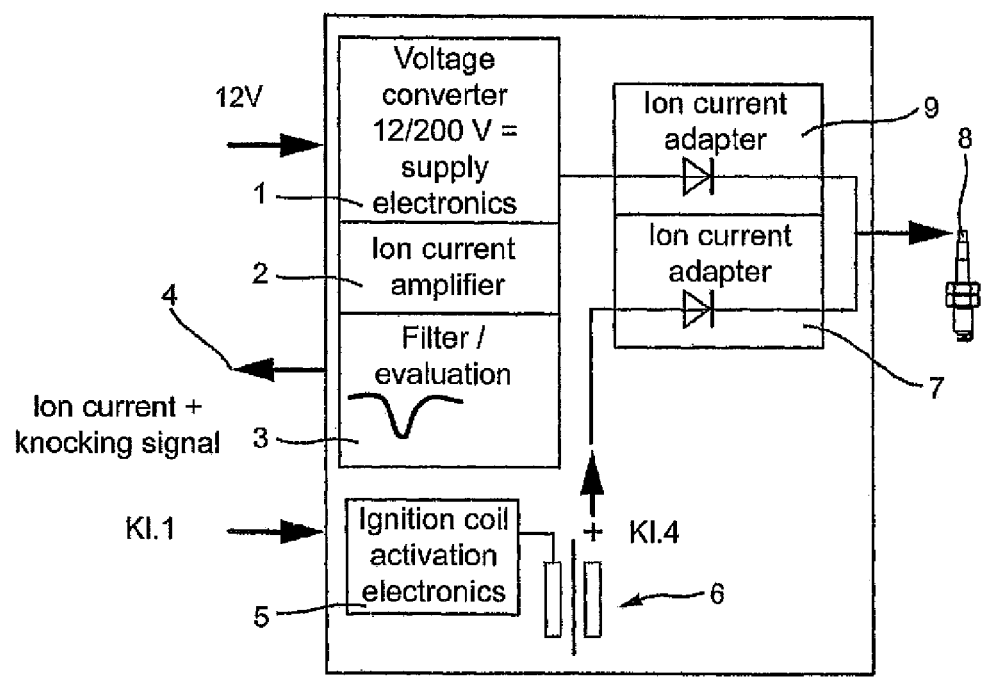
FIG. 1 shows the schematic circuit diagram of the ignition with ion current measurement.
Figure 2:
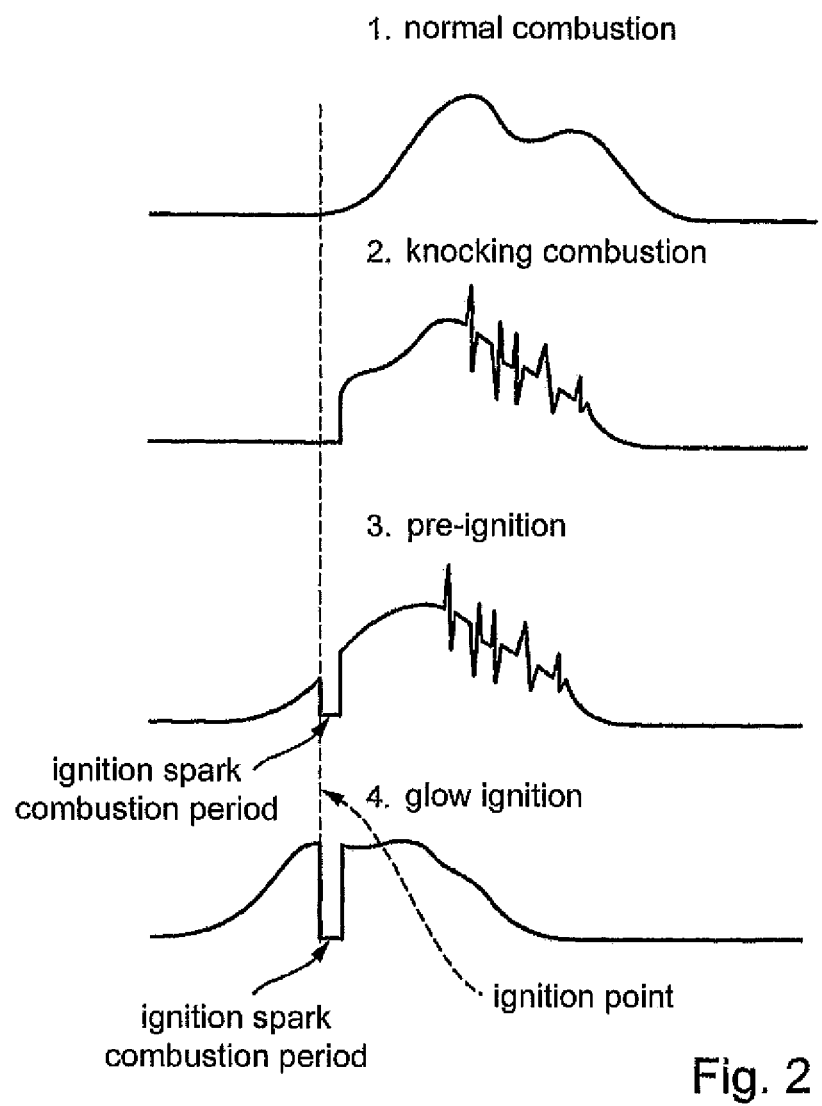
FIG. 2 shows the various curves of the ion current signals in the 4 relevant operating states of the engine.

In order to be able to pick off the ion current, an auxiliary voltage is generated by a DC-DC converter (1). Preferably, the DC-DC converter is short-circuit-proof and equipped with a current limiting device. In opposition to other publications, this has, among others, the advantage of continuous measurability. The auxiliary voltage can range from 30 V to 500 V, preferably from 150 V to 300 V.

The measured ion current is amplified, limited and coarsely filtered in an amplifier (2). The amplifier (2) can be designed such that the amplification factor is variable. That means that the amplification can be adjusted to the particular situation. For example, the amplification can be updated in relation to the speed or load. The ion current signal is further corrected via further adjusted or adjustable filters (3), thus facilitating the detection of knocking. Furthermore, this circuit block can be used to evaluate the ion current raw signal so that then nothing more is required than to transfer the diagnostics result to the engine control unit via the interface.

The ion current signal is output via an interface (4). Herein, a serial or an analog interface is conceivable. It is also possible to deliver the ion current information to the engine control unit via the activation line (e.g. Kl. 1). The activation electronics (5) of the ignition coil contains a switching transistor and possible safety circuits as well as further diagnostic functions. Said control electronics (5) activates the ignition coil (6) as hitherto. The ignition coil (6) has the positive output at Kl.4. The ion current adapter (7) lets the positively polarized ignition high voltage pass and blocks the ion current auxiliary voltage. Either the ignition voltage is applied to the spark plug (8) via the ion current adapter (7) (red arrow), or the ion current auxiliary voltage is applied to the spark plug (8) via the ion current adapter (9) (blue arrow).

Since the ignition voltage is positive in this ignition system, it is to particular advantage if the spark plug (8) is equipped with dual platinum electrodes or comprises a similarly wear-resistant construction type. The ion current adapter (9) which blocks the ignition high voltage and lets the ion current auxiliary voltage pass contains a high-voltage diode.

The ion current is measured via two different ion current adapters (7) and (9).

The additional filter for the measurement signal is also able to evaluate a knocking detection.

The constantly applied auxiliary voltage which is only superimposed by the ignition voltage during ignition allows evaluating the signal during the entire working cycle.

The measuring electronics (1) to (4) is accommodated in a separate housing. The ignition module (5) can also be contained therein.

The internal signal evaluation and the diagnostics result are supplied to the engine control unit.

The integration of the measuring adapters into the ignition coil results in improved combustion processes.

The integration of the ion current signal processing in the ignition unit or the ignition coil electronics reduces the effects of anomalies.

The integration of the auxiliary voltage generation in the ignition unit or the ignition coil electronics optimizes the combustion procedures.

The output of an ion current signal at an interface of the ignition coil ensures optimal data transmission results.

The installation of these entire electronics along with the ignition coil into an ignition coil housing revolutionizes combustion technology.

The raw signal of the ion current at the output of the ion current amplifier (2) is represented with the above-mentioned circuit that is integrated in the ignition coil as follows:

These raw signals are filtered and evaluated in the filter (3). As a result, precise statements can be made as to whether and which type of faulty combustion is incurred. This information can be provided to the engine control unit. It is also conceivable that the ignition coil automatically corrects the ignition point and reports this to the engine control unit if necessary, i.e., the ignition coil provides self-control with its activation. To a for extant, this is all independent of the electronics that has been integrated in ignition coils so far.

Where multiple ignition coils are concerned or if the measuring electronics is accommodated externally, measuring electronics consisting of the components (1) to (4) can be used for a plurality of spark plugs, because the signals can be allocated to the individual cylinders in the engine control unit. It is also possible to provide a separate input of the engine control unit for the measuring electronics, wherein said input can, for example, be used to transmit signals relating to the operating condition (speed, load, etc.), signals for controlling the amplification, or a signal for determining the point in time for the start and/or the end of the measurement window.

LIST OF REFERENCE SYMBOLS

1. Auxiliary voltage supply
2. Ion current amplifier
3. Signal filter
4. Ion current signal output
5. Activation electronics of ignition coil
6. Ignition coil
7. Ion current adapter with low-voltage diode
8. Spark plug
9. Ion current adapter with high-voltage diode

The invention claimed is:

1. An apparatus for the detection of combustion anomalies of an internal combustion engine, comprising:
   a spark plug as ion current sensor;
   a DCDC converter connected to the spark plug as a voltage supply for providing an ion current; and
   an ignition coil connected to the spark plug for providing an ignition voltage,
   wherein the DCDC converter is connected to the spark plug via a first diode, the ignition coil is connected to the spark plug via a second diode and these two diodes are connected in parallel.

2. The apparatus according to claim 1, wherein the apparatus comprises two ion current adaptors.

3. The apparatus according to claim 1, wherein the first diode connected to the DCDC converter is a low-voltage diode.

4. The apparatus according to claim 1, wherein at least one ion current adapter comprises at least one high-voltage diode.

5. The apparatus according to claim 1, wherein the spark plug is equipped with dual platinum electrodes.

6. The apparatus accordingly to claim 1, where ion current comprises at least 30 volts.

7. A method for detecting combustion anomalies during operation of an internal combustion engine, wherein an ion current comprising at least 30 volts is created by means of an auxiliary voltage that is provided by a DCDC converter and applied to a spark plug, an ion current signal in a combustion chamber of the engine is measured by means of an ion current sensor provided as the spark plug, the auxiliary voltage is applied to the spark plug via a first diode, and the auxiliary voltage is superimposed during an ignition process by an ignition voltage provided by an ignition coil.

8. The method according to claim 7, wherein the measured ion current signal is amplified by an amplifier which has a variable amplification factor and the amplification is updated in relation to speed or load.

9. The method according to claim 7, wherein the ignition voltage is applied to the spark plug via a second diode.

10. The method according to claim 9, wherein the diode, via which the ignition voltage is applied to the spark plug, is parallel to the first diode, via which the auxiliary voltage is applied to the spark plug.

11. The method according to claim 7, wherein the auxiliary voltage is constantly applied to the spark plug.

12. A method for detecting combustion anomalies during operation of an internal combustion engine, comprising:
   providing a spark plug;
   providing an ignition coil electrically connected to a first diode which is electrically connected to the spark plug for providing an ignition voltage;
   using the spark plug as an ion current sensor;
   providing a DCDC converter electrically connected to a second diode which is electrically connected to the spark plug as a voltage supply for providing an ion current, where the first and second diodes are connected in parallel;
   supplying the ion current to the spark plug;
   measuring a ion current signal in a combustion chamber of the engine during a combustion cycle through the spark plug operating as the ion current sensor;
   amplifying the ion current signal by an amplifier comprising a variable amplification factor; and
   adjusting the variable amplification factor based on a speed or a load.

13. The method of claim 12, wherein the ion current comprises at least 30 volts.

* * * * *